United States Patent
Beyer et al.

(10) Patent No.: US 7,754,300 B2
(45) Date of Patent: Jul. 13, 2010

(54) PLASTICZER IN ALKYL ACRYLATE VINYLIDENE CHLORIDE POLYMER

(75) Inventors: Douglas E. Beyer, Midland, MI (US); Steven R. Jenkins, Clare, MI (US); Eric K. C. Lee, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 573 days.

(21) Appl. No.: 11/663,374

(22) PCT Filed: Sep. 26, 2005

(86) PCT No.: PCT/US2005/034284

§ 371 (c)(1), (2), (4) Date: Mar. 20, 2007

(87) PCT Pub. No.: WO2006/044113

PCT Pub. Date: Apr. 27, 2006

(65) Prior Publication Data

US 2009/0123678 A1     May 14, 2009

Related U.S. Application Data

(60) Provisional application No. 60/618,003, filed on Oct. 12, 2004, provisional application No. 60/620,057, filed on Oct. 18, 2004.

(51) Int. Cl.
*A22C 13/00*     (2006.01)

(52) U.S. Cl. .................... 428/34.8; 428/35.5; 428/36.6; 428/36.92; 264/454

(58) Field of Classification Search ............... 428/34.8, 428/35.7, 35.5, 36.6, 36.92; 524/312, 313, 524/560; 525/902; 264/454
See application file for complete search history.

(56) References Cited

U.S. PATENT DOCUMENTS 6,291,565 B1 *   9/2001   Kling et al. ................. 524/312

* cited by examiner

*Primary Examiner*—Michael C Miggins (57) ABSTRACT

Articles comprise a monolayer blown film prepared from a composition comprising at least one vinylidene chloride polymer and at least one plasticizer wherein at least one vinylidene chloride polymer comprises vinylidene chloride and at least one alkyl acrylate, selected from methyl acrylate, ethyl acrylate, or butyl acrylate or a combination thereof in an amount of from 2.5 to 9 mole percent of the monomer content of the vinylidene chloride polymer and wherein the plasticizer is present in an amount of from 1 to 15 parts by weight per hundred parts of polymer, wherein the article is selected from a package, a container, a laminate, sausage casing or combination thereof, particularly a sausage casing, wherein at least 4 of designated characteristics are present. The invention also includes processes for making articles of the invention and films used therein.

9 Claims, 2 Drawing Sheets

PLASTICZER IN ALKYL ACRYLATE VINYLIDENE CHLORIDE POLYMER

CROSS REFERENCE TO RELATED APPLICATIONS

This application claims the benefit of U.S. Provisional Application Nos. 60/618,003 and 60/620,057, filed Oct. 12, 2004 and Oct. 18, 2004, respectively.

STATEMENT REGARDING FEDERALLY SPONSORED RESEARCH OR DEVELOPMENT

Not Applicable

BACKGROUND OF THE INVENTION

This invention relates to vinylidene chloride polymers and compositions thereof, particularly such compositions containing plasticizer. The invention also relates to the use of compositions of vinylidene chloride polymers in film.

DESCRIPTION OF THE PRIOR ART

Polymers of vinylidene chloride have been used in packaging because of their barrier properties to transport of water vapor, odors, oxygen, other migrating species, or combinations thereof. Such polymers are generally copolymers of vinylidene chloride because of the tendency of vinylidene chloride homopolymer to be stiff and crack as well as its crystallization characteristics. In commercial practice, copolymers of vinylidene chloride and such monomers as methyl acrylate have been widely used in multilayer films because such copolymers could provide excellent barrier properties while other layers could provide stability in film forming (bubble stability during the extrusion process) as well as film durability and sealing properties often less than desirable in such vinylidene chloride/alkyl acrylate polymers alone. Such multilayer films are within the skill in the art for instance as taught in such references as U.S. Pat. Nos. 6,045,924 and 5,759,702. Alone, as monolayer films, commercial vinylidene chloride/methyl acrylate polymers often exhibit such slow crystallization that they lack bubble stability necessary for film production, especially on efficient commercial equipment. Additionally, when monolayer films are formed, for instance by blowing a multilayer film and stripping away other layers, film durability is often low, especially during and after exposure to heat such as in retort or other cooking applications.

In monolayer films, even two ply monolayer films, vinylidene chloride copolymers with vinyl chloride have been used because of their combination of barrier properties with extrusion and bubble stability with film durability and sealing window. Vinyl chloride, however, has the disadvantage, for example of being slow to interpolymerize with vinylidene chloride.

A monolayer film with combinations of at least two of barrier properties, toughness, extrusion stability, bubble stability, film durability, sealing window, preferably for radio frequency sealing, to be useful in such applications as food wrap, retort packages, and packages such as sausage casings made from one or more plies of monolayer films and still having polymerization productivity or speed greater than that of copolymers of vinylidene chloride with vinyl chloride is desired.

There is a need for monolayer structures, particularly monolayer films and structures including packaging such as sheets, lidstock, and containers, for example, pouches, tubes and bags useful in high temperature applications such as bags suitable for hot-fill or in which foodstuffs can be cooked either at the time of packaging or by the consumer, for example, immersion in hot water or exposure to steam. Such thermal processing often is referred to as cook-in or retort, and films used in such processes are known as cook-in or retort films.

A cook-in, retort or hot-fill film is preferably capable of withstanding exposure to elevated temperature conditions suitable for cooking or filling for periods of time appropriate to cooking or filling without compromising its ability to contain the food product. This could range from brief contact with hot foods for filling to up to 12 hours in slow cooking conditions of 125° C. and greater, depending on the specific application. During such extended periods of time at elevated temperatures, a package formed from a cook-in film would preferably resist failure (that is, pulling apart either at seams or elsewhere).

SUMMARY OF THE INVENTION

It has been found that certain copolymers of alkyl acrylates, especially butyl acrylate, but in alternative embodiments preferably methyl acrylate or ethyl acrylate, and vinylidene chloride, when used with effective quantities of certain plasticizers, have desirable combinations of at least two of barrier properties, toughness, extrusion stability, bubble stability, film durability, sealing window and polymerization productivity or speed to be useful in such applications as monolayer films and packages such as sausage casings made from such films. Films of these compositions are suitable for production on efficient commercial film blowing equipment and are advantageously durable, preferably even when exposed to retort conditions.

The invention includes articles comprising a monolayer blown film prepared from a composition comprising at least one vinylidene chloride polymer and at least one plasticizer wherein at least one vinylidene chloride polymer comprises vinylidene chloride and at least one alkyl acrylate selected from methyl acrylate, ethyl acrylate, or butyl acrylate or a combination thereof in an amount of from 2.5 to 9 mole percent of the monomer content of the vinylidene chloride polymer and wherein the plasticizer is present in an amount of from 1 to 15 parts by weight per hundred parts of polymer, wherein the article is selected from a package, a container, a laminate, sausage casing or combination thereof wherein the alkyl acrylate is present in an amount that results in at least 4 of the following characteristics: (a) a crystallization temperature of at most about 75° C.; (b) a remelt temperature from 100° C. to 185° C.; (c) a failure rate of at most about 500 per 10000 after having been heated to a temperature of from 75° C. to 145° C. for a period of from 20 minutes to 200 minutes; (d) a oxygen permeability from $4.6 \times 10E-17$ $m^3.m/m^2.sec.atm$ to $9.1 \times 10E-13$ $m^3.m/m^2.sec.atm$; and (e) a glass transition temperature of at most about 10° C.

The invention includes processes for making articles of the invention including a step of (a) supplying a composition of the invention to a forming apparatus and advantageously at least one, more advantageously 2, preferably 3, more preferably 4, steps from among: (b) admixing the composition with at least one additive; (c) heating the composition sufficiently to facilitate flow through the forming apparatus; (d) blowing the composition; (e) allowing a formed article to cool after forming; or a process of making sausage casing including advantageously at least one, more advantageously 2, preferably 3, most preferably 4 steps of (a) folding a strip of film, (b)

sealing to form a side seam, (c) filling the resulting tube, and (d) cutting and closing at intervals; or a process for making film comprising (a) supplying a composition of the invention and at least 3, advantageously 4, more advantageously 5, preferably 6, more preferably 7, most preferably 8 of the steps of (b) extruding the composition into a tube form, (c) quenching the extruded tube, (d) collapsing the tube into a tape form, (e) reheating the collapsed tape in a warm tank, (f) sizing the tube to attain a desired width of the collapsed tape using a volume of fluid held inside the extruded tube, (g) forming a bubble of the composition, (h) collapsing the film bubble, and (i) winding the resulting film onto at least one roll; or a process for making an article comprising a composition of the invention including a step of radio frequency sealing. In a film blowing process, the temperature is preferably sufficient to allow a sufficient rate of inflation of the collapsed tape to form the bubble, but insufficient to cause sticking of the edge of the tape to the nip rolls exiting the warm tank, more preferably in the warm water tank the temperature is from 5° C. to 80° C. The film is preferably a monolayer film, optionally a two or more plies of monolayer film, optionally adhered to at least one adjacent ply.

The invention includes compositions comprising at least one plasticizer and at least one vinylidene chloride polymer having monomer units from vinylidene chloride and at least one alkyl acrylate, most preferably butyl acrylate or, in another embodiment methyl acrylate, or in a third embodiment ethyl acrylate, wherein the amount of alkyl acrylate is selected such that at least two, advantageously 3, preferably 4, more preferably 5, of the following conditions are met or the amount of alkyl acrylate is from 2.5 to 9 mole percent, or a combination thereof; where the conditions are: (1) a crystallization temperature that is low enough to achieve commercially acceptable bubble stability, and at most 75° C.; (2) a remelt temperature that is sufficiently low for extrusion at temperatures below those resulting in unacceptable degradation of the copolymer, but high enough to maintain a remelt temperature corresponding to a crystallization rate conducive to orientation, preferably at least 100° C. to 185° C.; (3) a failure rate that is within commercially acceptable limits, preferably at most about 500 per 10000; (4) an oxygen permeability that is low enough to avoid edibly unacceptable oxidation of a food under conditions to which it is exposed, preferably at most about $9.1 \times 10E-13$ $m^3.m/m^2.sec.atm$; (5) a glass transition temperature that is low enough to correspond to durability suitable for an intended application, preferably at most about 10° C., or any one or more of the properties are within a preferred range of those listed, and wherein the amount of plasticizer is such that at least one, preferably 2, more preferably 3, of the following conditions are met or, preferably, the amount of plasticizer is from 1 to 15 weight percent of the composition or a combination thereof: (1) a viscosity during extrusion that is not too high to achieve an extrusion rate without shear heating sufficient to cause degradation of polymer but that is not too low for sufficient melt strength to perform film forming; (2) a crystallization rate sufficient to correspond to a stable bubble but not an unacceptable drop in the barrier properties of the film; or (3) a film modulus desirable for the application.

The plasticizer preferably includes at least one epoxy plasticizer and at least one ester plasticizer, more preferably the epoxy plasticizer is in a amount sufficient to measurably protect the vinylidene chloride polymer from thermal degradation but not to result in plating-out of the epoxy plasticizer or unacceptably reduce barrier properties and the ester plasticizer is in a amount sufficient to lower the melt viscosity to avoid excessive shear heating and polymer degradation and to increase the rate of crystallization to achieve a stable bubble but not to unacceptably lower the barrier properties, most preferably the epoxy plasticizer is in a amount of from 0.1 to 15 parts by weight of the vinylidene chloride polymer and the ester plasticizer is present in an amount sufficient to result in a total plasticizer sufficient to achieve conditions or amounts previously listed. Such compositions of the invention, in addition to one or more plasticizers, optionally include other additives within the skill in the art.

The invention includes a process for admixing at least one vinylidene chloride polymer, and at least one plasticizer or combinations thereof to form compositions of the invention.

The invention also includes articles such as a film, a package, a foam, a container, a sheet, a laminate or combination thereof, advantageously film, package, sheet, sausage casing, more advantageously package including wrap or casing, preferably food packaging, more preferably sausage casing made from a composition of the invention. The sausage casing preferably comprises at least one monolayer film, or preferably has a thickness of from 1 micron ($1 \times 10^{-6}$ m) to 500 micron ($500 \times 10^{-6}$ m) or a combination thereof. Each of the articles independently preferably can endure heat of from 35° C. to 155° C. for a period of from 1 minute to 240 minutes as demonstrated by sausage casing breakage during retort per 10,000 retorted sausages of at most about 500.

The invention additionally includes blends of a composition of the invention with at least one additional polymer, preferably at least one thermoplastic polyurethane or copolymer of an alpha olefin and an alkyl ester of an unsaturated carboxylic acid wherein the acrylate PVDC or combination thereof according to the practice of the invention is greater than about 50 weight percent of the polymers present in the blend.

The invention includes a composition comprising at least one vinylidene chloride polymer and at least one plasticizer wherein at least one vinylidene chloride polymer comprises vinylidene chloride and at least one alkyl acrylate selected from methyl acrylate, ethyl acrylate, or butyl acrylate or a combination thereof in an amount of from 2.5 to 9 mole percent of the monomer content of the vinylidene chloride polymer and wherein the plasticizer is present in an amount of from 1 to 15 parts by weight per hundred parts of polymer, especially a composition wherein the alkyl acrylate is present in an amount that results in at least 4 of the following characteristics:

(a) a crystallization temperature of at most about 75° C.;

(b) a remelt temperature sufficiently low for extrusion at temperatures below those resulting in unacceptable degradation of the copolymer but corresponding to a crystallization rate conducive to orientation;

(c) a failure rate of at most about 500 per 10000:

(d) a oxygen permeability low enough to avoid edibly unacceptable oxidation of a food under conditions to which it is exposed;

(e) a glass transition temperature of at most about 10° C.

The invention also includes a process of forming a film or article comprising blowing a film or blow molding an article from a composition of the invention, especially wherein the film is blown using a double-bubble method; or comprises (a) supplying a composition comprising at least one vinylidene chloride polymer, and at least one plasticizer according to the practice of the invention; (b) extruding the composition through an annular die into a tube form; (c) quenching the extruded tube in a cold water bath; and (d) collapsing the tube into a tape form or comprises (a) supplying a composition comprising at least one vinylidene chloride polymer and at least one plasticizer according to the practice of the invention (b) extruding the composition into a tube form, (c) quenching the extruded tube, (d) collapsing the tube into a tape form, (e) reheating the collapsed tape in a warm tank, (g) forming a bubble of the composition, (f) sizing the tube to attain a desired width of the collapsed tape using a volume of fluid held inside the extruded tube, (h) collapsing the film bubble, and (i) winding the resulting film onto at least one roll; or comprises (a) supplying a composition according to the practice of the invention to a forming apparatus; (b) admixing the composition with at least one additive (c) heating the composition sufficiently to facilitate flow through the forming apparatus (d) blowing the composition (e) allowing a formed article to cool after forming.

Additionally, the invention includes article comprising a composition of the invention, especially comprising a film, a package, a foam, a container, a sheet, a laminate or combination thereof and more especially wherein the article is a sausage casing, food packaging, or monolayer film. In each instance, the article preferably comprises at least one film made using a double-bubble method of film blowing. Moreover the invention includes an article comprising a monolayer film of at least one vinylidene chloride polymer and at least one plasticizer wherein at least one vinylidene chloride polymer comprises vinylidene chloride and at least one alkyl acrylate selected from methyl acrylate, ethyl acrylate, or butyl acrylate and wherein the total alkyl acrylate is in an amount of from 2.5 to 9 mole percent of the monomer content of the vinylidene chloride polymer and wherein the plasticizer is present in an amount of from 1 to 15 parts by weight per hundred parts of polymer, wherein the article is a package, a container, a laminate, a sausage casing or a combination thereof, especially when the article is a retort or hot fill bag, pouch, package, container, or casing.

DETAILED DESCRIPTION OF THE INVENTION

Definitions

"Crystallization temperature" is the temperature at which the maximum recrystallization rate occurs in a differential scanning calorimeter (DSC). It is measured by DSC on a sample which is first melted at 185° C. and then quenched cooled with liquid nitrogen. The sample is then placed in the DSC and scanned from −10° C. to 200° C. at a rate of 10° C./minute.

"Remelt temperature" is temperature at which the maximum of the melting peak occurs in DSC apparatus. A resin sample is heated to 185° C. to melt the resin, removed from the oven, placed on the bench top to cool to room temperature and annealed for 2 hours at 80° C. The sample is then placed in the DSC, allowed to equilibrate at ambient temperature and scanned from ambient temperature to 200° C. at 20° C./minute.

"Failure rate" is breakage rate of sausage packages using the extruded film from the formulated resin when subjected to retort conditions. It is measured by the number of sausage package breaks as determined visually during retort cooking per 10,000 of uncooked sausages. The retort conditions are 121° C. for 45 minutes. For this test, tubes having dimensions of 80 mm circumference and approximately 200 mm long are formed from film produced by the double bubble method described herein, followed by radio frequency sealing at approximately 27.12 MHz, 1200 volts and 75 mA current. They are filled with 40 gm of a composition of a sausage, which may vary in constituents and characteristics. A typical mix would include approximately 25 percent pork, 25 percent starch, 50 percent water and minor amounts of ingredients for flavor and preservative.

"Oxygen permeability" as used herein is the volume of oxygen that passes through a given cross sectional area (1 square meter) of film (or layer of a film) of a unit thickness (1 micron) made from the formulated resin. It is measured according to the procedures of ASTM D 3985 at 23° C. and 50 percent Relative Humidity (RH) with a unit of measurement of cubic centimeters-micron/square meter-24 hour-atmosphere or converted to $m^3 \cdot m/m^2 \cdot 86400 \sec \cdot atm$.

The term "Radio frequency sealing" means a method for sealing films of polar materials by which radio frequency electromagnetic waves are used as the energy source for the heating of the polar materials where radio frequency is radiation of a frequency of from 5 to 50 MHz. The changing polarity of the radio waves being passed through the dielectric polymer is believed to cause the polarized molecules to vibrate and generates heat at the molecular level. When sufficient radio frequency energy is applied, the polymer melts and sealing of immediately adjacent layers results.

"Sealing window" is the width of the window between the sealing current that barely seals a film and that which burns it in mA. In the practice of the invention, sealing is preferably by radio frequency. Relative sealability by radio frequency energy of different poly(vinylidene chloride) copolymer films is measured by a sealing window test. In this test, two double-ply films of 20 micron thickness each layer (for a total thickness of 40 micron for each layer of double-ply film as the film is overlapped to make a seal; the total seal thickness is 80 microns). The layers are sealed against each other using an alternating current of 27.12 MHz frequency and 1200 volts, transmitted by an electrode of 0.5 mm in width and 30 mm in length through the two double-ply films. The speed of travel of the films under the sealing electrode is held constant at about 0.40 m/sec. The energy transmitted by the sealing electrode is controlled by the amount of electric current traveling from the electrode through the films to be sealed. When the sealing current is too small, there is no seal. In contrast, when the current is too high, there is burn-through of the film layers from excessive melting. The sealing window of the poly (vinylidene chloride) copolymer film is measured by the width of the sealing current range in which sealing occurs. Both the current (in mA) for the just-sealed condition and the burned-through condition are reported.

"Polymerization rate" is the relative rate of conversion of the monomer mixture to copolymer as measured by, for example, a calorimetric reactor, compared to the conversion rate of vinylidene chloride to poly(vinylidene chloride) homopolymer. It is measured by determining the rate of polymerization of the copolymer relative to the rate of polymerization of vinylidene chloride alone under the same conditions and at approximately 6 percent conversion.

"Glass transition temperature" is the temperature at which the glass transition inflection point occurs in a DSC (Differential Scanning Calorimeter). It is measured on a sample that is first melted at 185° C. and then rapidly cooled to ambient temperature by removing from the oven and placing on the bench top or metal surface. The sample is then immediately placed in the DSC, cooled to −30° C., equilibrated at −30° C.

for 60 seconds and scanned from −30° C. to 100° C. at 10° C./minute. The glass transition temperature is then measured as the temperature of the inflection point between the onset and endpoint of the glass transition.

"Molecular weight" is the weight average molecular weight in Daltons. It is measured by size exclusion chromatography using polystyrene calibration. Sample preparation includes dissolving a polyvinylidene chloride resin sample in tetrahydrofuran (THF) at 50° C. Resin samples containing more than about 94 percent vinylidene chloride do not readily dissolve at this temperature, and dissolving at elevated temperature can result in degradation of the polymer molecular weight. Therefore, resin samples containing more than about 94 percent vinylidene chloride are pre-dissolved as a 1 percent (%) solution, in inhibited THF at 63° C. Samples can be dissolved at up to 83° X for 4 hours without loss of molecular weight, though minimizing dissolving time and temperature is desirable. The polymers are then analyzed for determination of molecular weight by gel permeation chromatography (GPC) using the Polymer Laboratories Software on a Hewlett Packard 1100 chromatograph equipped with two columns in series. These columns contain 5 μm Styrene/divinylbenzene copolymer beads commercially available from Polymer Laboratories under the trade designation PLGel 5 MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (∼3,000,000 to 2000 Mp)) in conjunction with their elution volumes.

The term "crystallization" as used herein means the rearrangement of a portion of polymer molecules into more organized, denser structures commonly called crystallites, as measured by the described crystallization temperature test. Polymer crystallization normally occurs during the bubble blowing operation of monolayer film processes.

The term "sausage casing" as used herein means any film, wrap or tubing which surrounds a mass of edible matter as illustrated by a sausage, preferably in a generally cylindrical shape.

"Film" refers to a sheet, non-woven or woven web or the like or combinations thereof, having length and breadth dimensions and having two major surfaces with a thickness therebetween. A film can be a monolayer film (having only one layer) or a multilayer film (having two or more layers). A multilayer film is composed of more than one layer preferably composed of at least two different compositions, advantageously extending substantially the length and breadth dimensions of the film. Layers of a multilayer film are usually bonded together by one or more of the following methods: coextrusion, extrusion coating, vapor deposition coating, solvent coating, emulsion coating, or suspension coating. A film, in most instances, has a thickness of up to about 20 mils ($5 \times 10^{-4}$ m).

"Layer" means herein a member or component forming all or a fraction of the thickness of a structure wherein the component is preferably substantially coextensive with the structure and has a substantially uniform composition.

The term "monolayer film" as used herein means a film having substantially one layer. Optionally, however, more than one ply of monolayer film is used in an application with or without one or more adhesives between adjacent plies. Thus, a film is considered monolayer if it is formed in a process considered in the art to be a monolayer process, for instance, formed by a double bubble process rather than a coextrusion process, even if two layers of a composition according to the practice of the invention are used adjacent to one another or even with an adhesive between the layers. When adhesive is used, each occurrence commonly has a thickness of at most about 10 percent, preferably at most about 5 percent of the total thickness of the structure of which it is a part. For purposes of this invention, a film that is monolayer when produced is considered monolayer even when it is used in packaging that may involve adjacency, adherence, or both to other materials.

"Extrusion," and "extrude," refer to the process of forming continuous shapes by forcing a molten plastic material through a die, followed by cooling or chemical hardening. Immediately prior to extrusion through the die, the relatively high-viscosity polymeric material is fed into a rotating screw, which forces it through the die.

"Coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in film blowing, casting film, and extrusion coating processes.

"Cook" means to heat a food product thereby effecting a change in one or more of the physical or chemical properties thereof (for example, color, texture, and taste).

"Cook-in" as used herein is intended to refer to packaging structurally capable of withstanding exposure to cook-in time-temperature conditions while containing a food product. Cook-in packaged foods are essentially pre-packaged, pre-cooked foods that go directly to the consumer a configuration to be consumed with or without warming. Cook-in time-temperature conditions typically refer to a long slow cook, for example submersion in water of at least about 70° C. and preferably up to about 80° C. for at least about 4 hours, preferably up at least about 6 hours, more preferably up to about 12 hours. Such cook-in time-temperature requirements are representative of institutional cooking requirements. Under such conditions, a cook-in packaging advantageously maintains seal integrity and is delamination resistant.

"Hot-fill" refers to processes wherein hot materials are packaged. For instance, hot foods may be packaged in bags. The hot materials are commonly at temperatures of at least about 65° C., preferably at least about 85° C. Hot fill processes in most instances involve cooling immediately after contact with the hot materials or foods.

"Retorting" refers to exposure to temperatures of at least about 100° C., preferably at least about 121° C., for a period of time sufficient to cook, pasteurize, sterilize or otherwise heat treat material.

"Elevated temperature" or "high temperatures" to which a multicomponent structure of the invention may be exposed are those encountered in hot-fill, cook-in applications or retorting.

"Oriented" or "stretch-oriented" refers to a polymer-containing material which has been stretched at an elevated temperature (the orientation temperature), followed by being "set" in the stretched configuration by cooling the material while substantially retaining the stretched dimensions. A material can be stretched in one direction (uniaxial orientation), two directions (biaxial orientation), or multiple directions. Biaxial orientation typically occurs in two directions which are perpendicular to one another, such as the longitudinal direction and the transverse direction.

"Seal" (noun) means a bond of a first region of a film surface or component surface to a second region of a film surface or component surface (or opposing surfaces). In heat sealing, it is created by heating (for example, by means of a heated bar, hot wire, hot air, infrared radiation, and ultrasonic sealing) the regions (or surfaces) to at least their respective softening points;

"Heat-seal" (also known as a "heat-weld") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

"Barrier" means (a film with) a low permeance or permeability toward one or more gases (for example, oxygen, water vapor, odor, preferably oxygen). The amount of permeability is determined by the intended application.

"Polymer" means the polymerization product of one or more monomers and is inclusive of homopolymers as well as interpolymers, copolymers, terpolymers, tetrapolymers, etc., and blends and modifications of any of the foregoing.

"Mer unit" means that portion of a polymer derived from a single reactant molecule; for example, a mer unit from ethylene has the general formula —$CH_2CH_2$—.

"Homopolymer" means a polymer consisting essentially of a single type of repeating mer unit.

"Interpolymer" or "Copolymer" refers to a polymer that includes mer units derived from at least two reactants (normally monomers) and is inclusive of random, block, segmented, graft, etc., copolymers, as well as terpolymers, tetrapolymers, and trimers and oligomers. In this invention, the terms copolymer and interpolymer are used for polymers believed to be random copolymers unless stated otherwise.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "105" includes at least from 104.5 to 105.49. Furthermore, all lists are inclusive of combinations of two or more members of the list. All percentages and ratios refer to weight percent based on total composition according to the practice of the invention unless stated otherwise, except that percentages of monomers in a polymer are mole percentages unless stated otherwise. All amounts, percentages, ratios, proportions and other measurements are by weight unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when a material capable of causing undesirable effects is present in amounts or in a form such that it does not cause the effect to an unacceptable degree, it is considered substantially absent for the practice of this invention. Furthermore, the terms "unacceptable" and "unacceptably" are used to refer to deviation from that which can be commercially useful or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end. This invention is applicable to vinylidene chloride polymers, particularly alkyl acrylate vinylidene chloride polymers (acrylate PVDC). The vinylidene chloride polymer has monomer units from vinylidene chloride and at least one alkyl acrylate. Such alkyl acrylates include alkyl acrylates having alkyl groups of from 1 to 5 carbon atoms and combinations thereof, preferably methyl acrylate, ethyl acrylate, or butyl acrylate, or combinations thereof, more preferably methyl or butyl acrylate, or combinations thereof, more preferably in one embodiment, butyl acrylate, or combinations therewith, and more preferably in another embodiment, methyl acrylate or combinations therewith. In one embodiment, butyl acrylate is preferred because it results in more rapid crystallization (lower temperature) of copolymers with vinylidene chloride and because of toughness (durability) and the improved performance of films of these copolymers when exposed to retort conditions. In another embodiment, methyl acrylate is preferred because methyl acrylate results in lower permeability at comparable mole percent alkyl acrylate. In a third embodiment, ethyl acrylate is preferred because it provides a balance between toughness and barrier or permeability. In an alternative embodiment, the vinylidene chloride polymer optionally also has at least one additional mono-unsaturated monomer polymerizable with vinylidene chloride and an alkyl acrylate, such as vinyl chloride, alkyl methacrylates, acrylic acid, methacrylic acid, itaconic acid, acrylonitrile, methacrylonitrile, and combinations thereof, preferably alkyl methacrylates, acrylic acid, methacrylic acid, itaconic acid, acrylonitrile, methacrylonitrile, or combinations thereof.

The alkyl acrylate affects bubble stability as indicated by measurements of crystallization temperature of the polymer. Crystallization advantageously occurs sufficiently quickly at temperatures encountered in film blowing that a bubble is formed and is stable. Without sufficient crystallization at temperatures encountered, the polymer remains liquid, with insufficient dimensional integrity to form a bubble suitable for film forming and collection. At least one alkyl acrylate is preferably present in amounts sufficient for a crystallization temperature low enough to achieve commercially acceptable bubble stability. The crystallization temperature preferably is at most about 75° C., more preferably at most about 60° C. and most preferably at most about 50° C.

The alkyl acrylate also affects extrusion stability as indicated by measurements of remelt temperature. At least one alkyl acrylate is preferably present in amounts sufficient for a remelt temperature sufficiently low for extrusion at temperatures below those resulting in unacceptable degradation of the copolymer but, when used for oriented films, high enough to maintain a remelt temperature corresponding to a crystallization rate conducive to orientation, otherwise insufficient alkyl acrylate to result in unacceptably high permeability or high crystallization temperature. Preferred remelt temperatures vary with the application. Whereas a film designed to withstand retort preferably has a remelt temperature greater than about 120° C., a film for use at room temperature may need a remelt temperature of only slightly above room temperature. For a range of applications, the remelt temperature preferably is at least about 100° C., more preferably at least about 120° C. and most preferably at least about 140° C. The remelt temperature preferably is at most about 185° C., more preferably at most about 175° C. and most preferably at most about 170° C.

The alkyl acrylate also affects film durability as indicated, in the case of films to be exposed to cooking or other higher temperatures, by measurements of failure rate of sausages packaged in the film during retort. This failure rate is determined as described elsewhere herein. At least one alkyl acrylate is preferably present in amounts sufficient for a failure rate within commercially acceptable limits. Commercially acceptable limits vary with the application but are readily determined by those skilled in the art using such factors as conditions to which an article comprising the composition according to the invention is exposed. The failure rate preferably is at most about 500 per 10000, more preferably at most about 150 per 10000 and most preferably at most about 20 per 10000. While it is ideal that the failure rate is 0, it is recognized that the failure rate is often at least about 150 per 10000 even in commercially desirable formulations.

The alkyl acrylate also affects barrier properties as indicated by measurements of oxygen permeability. At least one alkyl acrylate is preferably present in amounts sufficient to improve properties like remelt temperature for a oxygen permeability low enough to avoid edibly unacceptable oxidation of a food under conditions to which it is exposed, for instance for meat exposed to atmospheric concentrations of oxygen at temperatures of approximately 5 to 35° C. over a period of approximately 1 to 6 months. Desired oxygen permeability thus varies with the desired application of the vinylidene chloride polymer. For instance, a hard package for storage of frozen cooked vegetables for a maximum of a month has different requirements than that of a thin film wrapping a meat for pressure cooking and subsequent exposure to heated gases including oxygen. Those skilled in the art can determine acceptable permeability for each application using such factors as conditions to which the polymeric article is exposed, thickness of article, length of exposure time, identity and concentration of the gas to be excluded, heat, susceptibility of the protected material to the effects of the excluded gas, and permissible amount of effect from the gas. The oxygen permeability preferably is at most about $9.1 \times 10E-13$ $m^3.m/m^2.sec.atm$, more preferably at most about $4.6 \times 10E-14$ $m^3.m/m^2.sec.atm$ and most preferably at most about $2.3 \times 10E-14$ $m^3.m/m^2.sec.atm$. While zero oxygen permeability is ideal, the oxygen permeability is often at least about $4.6 \times 10E-17$ $m^3.m/m^2.sec.atm$.

The alkyl acrylate affects the manufacturing consistency and productivity. Polymerization of vinylidene chloride with alkyl acrylates produces a uniform composition copolymer as recognized by R. A. Wessling, *Polyvinylidene Chloride*, Gordon and Breach Science Publishers, New York, pp. 21-27, (1977). This allows for production of more consistent composition vinylidene chloride-alkyl acrylate copolymers compared with, for example, vinylidene chloride-vinyl chloride copolymers, which exhibit a significant composition drift over the course of a polymerization. While copolymerization of vinylidene chloride with other monomers may result in a reduction of polymerization rate, the rate decrease associated with alkyl acrylate copolymers is significantly less than the rate decrease exhibited by, for example, vinyl chloride copolymers as shown in Table 3 herein. This allows higher manufacturing productivity for vinylidene chloride-alkyl acrylate copolymers.

The alkyl acrylate also affects low temperature durability as indicated by measurements of glass transition temperature. At least one alkyl acrylate is preferably present in amounts sufficient for a glass transition temperature low enough to correspond to durability suitable for an intended application. The glass transition temperature advantageously at most about 10° C., preferably is at most about 4° C., m ore preferably at most about 0° C. and most preferably at most about −4° C. The glass transition temperature is advantageously as low as possible.

The alkyl acrylate is advantageously present in amounts (as mole percentage) of at least about 2.5, preferably present in amounts of at least about 3.4, more preferably at least about 3.8 and most preferably at least about 4.2. The alkyl acrylate advantageously present in amounts of at most about 9, preferably at most about 7.5, more preferably at most about 6.5 and most preferably at most about 5.5 mole percent. These same amounts are the preferences when the alkyl acrylate is butyl acrylate, methyl acrylate or ethyl acrylate.

The remainder of the monomer content of the vinylidene chloride polymer is preferably vinylidene chloride, but in an alternative embodiment a second alkyl acrylate is present in an amount less than that of the first alkyl acrylate, preferably butyl acrylate. Preferences for the amounts of combined alkyl acrylates are those previously listed for alkyl acrylate. In a second alternative, but not preferred, embodiment at least one additional mono-unsaturated monomer polymerizable with vinylidene chloride and an alkyl acrylate is optionally present in amounts less than the amounts of alkyl acrylate, or preferably butyl acrylate, preferably at most about 8, more preferably at most about 6 and most preferably at most about 3 mole percent.

The vinylidene chloride, alkyl acrylate, and optionally additional mono-unsaturated monomer polymerizable with vinylidene chloride and an alkyl acrylate or combinations thereof are combined by polymerization, preferably suspension polymerization. The process includes at least a step of (a) contacting a composition comprising at least one vinylidene chloride and at least one alkyl acrylate and (b) exposing them to conditions effective for polymerization thereof. The polymerization is within the skill in the art such as taught by U.S. Pat. No. 2,968,651, U.S. Pat. No. 3,007,903, U.S. Pat. No. 3,879,359, and U.S. Pat. No. 6,627,679 except that specific monomers and monomer compositions necessary to achieve the desired polymer compositions are used along with and specific selections of polymerization conditions including; time, temperature, initiators to achieve the desired molecular weights.

Advantageously, the polymerization is carried out such that the vinylidene chloride polymer has a weight average molecular weight advantageous for effective viscosity during extrusion, film durability, and manufacturing productivity. Molecular weight in excess of that advantageous for viscosity and durability reduces manufacturing productivity. The molecular weight is advantageously at least about 50,000, preferably at least about 70,000, more preferably at least about 80,000, most preferably at least about 90,000 Daltons. The molecular weight is preferably at most about 200,000, more preferably at most about 150,000, most preferably at most about 130,000. In one embodiment, vinylidene chloride polymers having at least 2 molecular weights within these preferences are blended to form a bimodal or multimodal composition usually having a greater molecular weight distribution than either of the polymers alone. In another embodiment vinylidene chloride polymers having at least two molecular weights which are independently optionally outside the preferences previously stated are blended into a bimodal or multimodal composition having an average molecular weight within these preferences. A bimodal composition advantageously has greater durability, flow strength, stability, processability or a combination thereof than that of a monomodal composition of the same average molecular weight.

In addition to vinylidene chloride polymer, compositions of the invention also contain at least one plasticizer. Such plasticizers include epoxidized oils such as epoxidized soybean oil, epoxidized linseed oil, dibutyl sebacate, acetyl tributyl citrate, other polymeric or high molecular weight ester oils, advantageously having a molecular weight of at least about 300 and combinations thereof, preferably epoxidized oils and aliphatic esters and combinations thereof, more preferably epoxidized soybean oil, epoxidized linseed oil, dibutyl sebacate, acetyl tributyl citrate and combinations thereof.

In one embodiment, a combination of plasticizers is advantageously used. The combination preferably includes at least one plasticizer that has at least one epoxy group (hereinafter epoxy plasticizer) and at least one plasticizer that contains at least one ester functionality (hereinafter ester plasticizer). The epoxy plasticizers include epoxidized soybean oil, epoxidized linseed oil, epoxidized sunflower oil, epoxidized vegetable oils, and other epoxidized triglycerides and combinations thereof, preferably epoxidized vegetable oils, epoxidized linseed oil, epoxidized soybean oil and combinations thereof, more preferably epoxidized soybean oil and combinations thereof. The ester plasticizers include dibutyl sebacate, acetyl tributyl citrate, other citrate esters, other polymeric or high molecular weight ester oils, advantageously having a molecular weight of at least about 300 and combinations thereof, preferably dibutyl sebacate, acetyl tributyl citrate and combinations thereof, more preferably dibutyl sebacate and combinations thereof. Combinations are advantageous because the epoxy plasticizer provides protection against thermal degradation of the vinylidene chloride polymer, while the ester plasticizer is more effective in plasticization and, thus, reduces the total weight percentage of plasticizer needed to achieve a predetermined level of plasticization as compared with an epoxy plasticizer alone.

The plasticizer affects viscosity during extrusion. The plasticizer is used in an amount sufficient for a viscosity during extrusion that is not too high to achieve an extrusion rate without shear heating sufficient to cause degradation of polymer, but not too low for sufficient melt strength to perform film forming. The plasticizer also affects crystallization rate. The plasticizer is used in an amount sufficient for a crystallization rate corresponding to a stable bubble, but insufficient to result in an unacceptable drop in the barrier properties of the film. The plasticizer affects film modulus. The plasticizer is used in an amount sufficient for a film modulus that is desirable for the application. Amounts of plasticizer in excess of that effective for the foregoing purposes are avoided to reduce loss of barrier. Optimum amounts of plasticizer vary with the identity of the plasticizer and its relative ability to plasticize poly(vinylidene chloride) copolymer. In common situations, such as those described herein, the plasticizer is present in an amount in parts by weight per hundred parts by weight of vinylidene chloride polymer of at least about 1, more preferably at least about 2, most preferably at least about 3. The plasticizer is preferably at most about 15, more preferably at most about 9, most preferably at most about 6 parts by weight per hundred parts by weight of vinylidene chloride polymer. Where the larger amounts of 12 to 15 parts by weight per hundred are appropriate for applications requiring medium barrier properties, such as wrap for gassy cheeses, and the smaller amounts of 3 to 9 percent, preferably 4 to 6 parts by weight per hundred are preferably for applications where greater barrier properties are preferred like sausage casings.

When combinations of plasticizers are used, the epoxy plasticizer is used in an amount sufficient to measurably protect the vinylidene chloride polymer from thermal degradation, but insufficient to result in plating-out of the epoxy plasticizer or unacceptably reduced barrier properties. Similarly, the ester plasticizer is used in an amount sufficient to lower the melt viscosity to avoid excessive shear heating and polymer degradation and to increase the rate of crystallization to achieve a stable bubble but insufficient to unacceptably lower the barrier properties. The epoxy plasticizer is optional and can, therefore, be present in a concentration or amount of 0. Preferably, the epoxy plasticizer is present in amounts (as parts by weight per hundred parts of the polymer according to the practice of the invention) of at least about 0.1, more preferably at least about 0.5, most preferably at least about 1. The epoxy plasticizer is preferably at most about 15, more preferably at most about 9, most preferably at most about 6 parts by weight per hundred parts of the polymer. The ester plasticizer is preferably present in amounts sufficient to result in preferred amounts of total plasticizer previously described.

At least one vinylidene chloride polymer, and at least one plasticizer or combinations thereof are combined by admixing. The process includes at least steps of (a) contacting at least one vinylidene chloride polymer with at least one plasticizer, or a combination thereof and (b) achieving a physically uniform distribution of the polymer, plasticizers and optionally other additives by mechanical means, optionally with heat. The admixing is within the skill in the art including such processes as dry blending, slurry mixing, solution mixing, melt blending and combinations thereof including solution mixing with monomer prior to polymerization and blending with resin after polymerization. Where shear forces are used, preferred shear rates are from 1 to 1000 reciprocal second.

Figure 1:
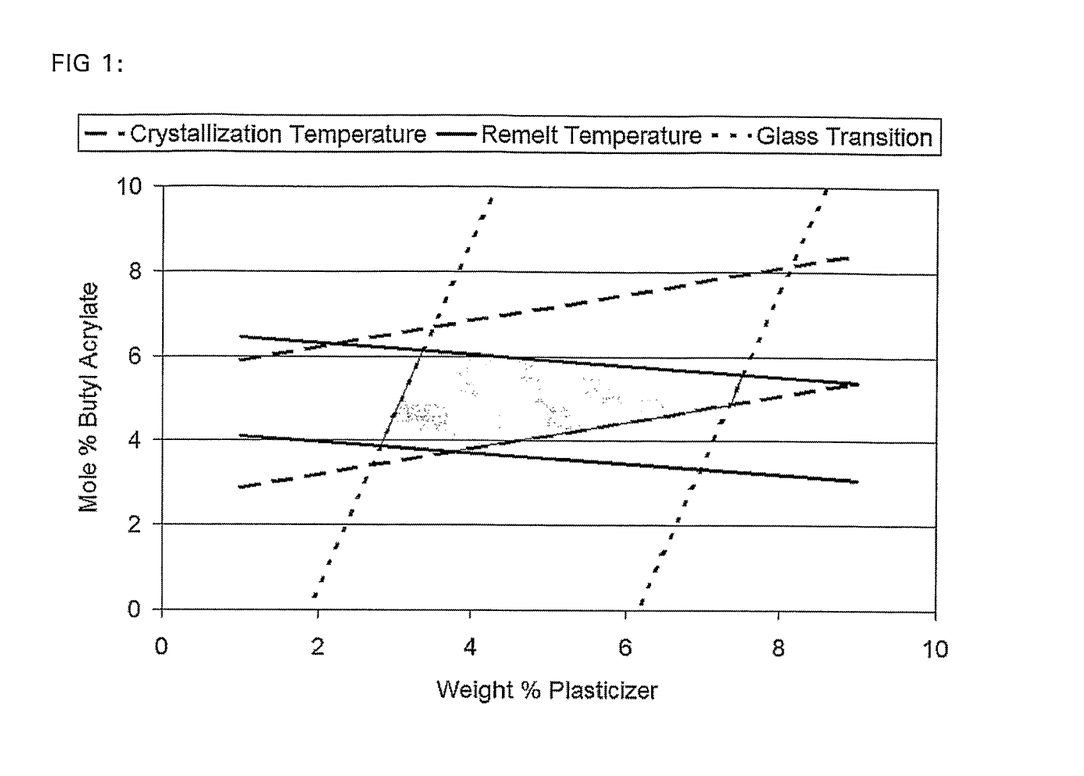
FIG. 1 is a graphical representation of the percentages of butyl acrylate and plasticizer that give preferred remelt, glass transition and crystallization temperatures.

FIG. 1 illustrates the relationships among amounts of plasticizer and alkyl acrylate and performance properties. Given an example or desired target performance of 160 to 175° C. remelt temperature (between solid lines), 40 to 75° C. crystallization temperature (between dashed lines) and −15 to −5° C. glass transition temperature (between dotted lines), the shaded area shows the potential compositions that could be used for a vinylidene chloride/butyl acrylate copolymer and a plasticizer composed of 1 percent by weight epoxidized soybean oil and the balance dibutyl sebacate. Variation in the type of plasticizer or plasticizer combination will result in somewhat different placement of the lines. Those skilled in the art are able to determine such lines and composition ranges without undue experimentation given the information herein. Similarly, different target performance properties will also result in different placement of the lines.

Figure 2:
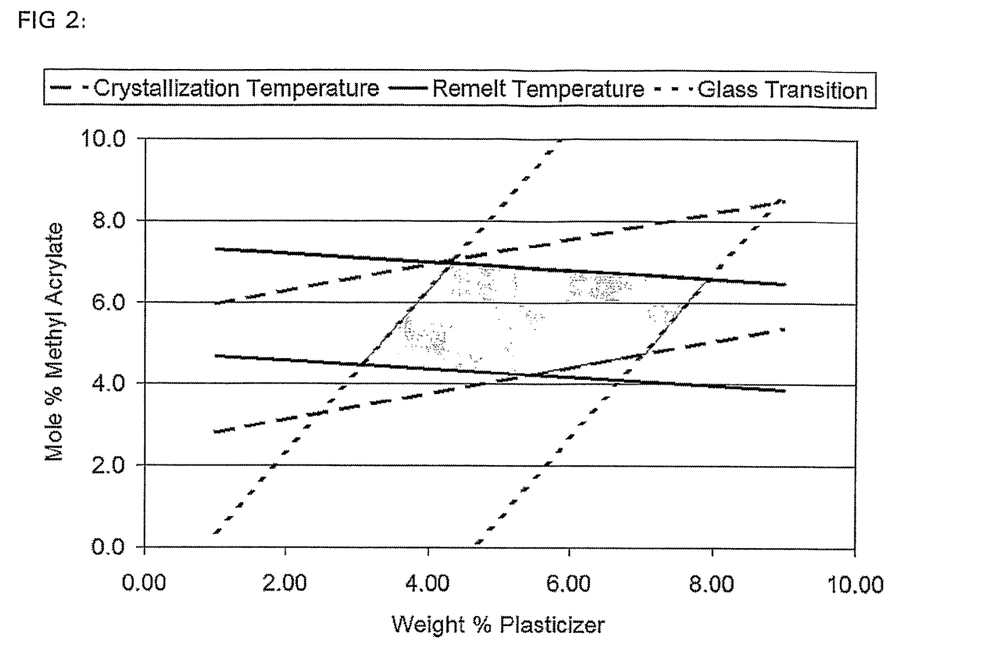
FIG. 2 is a graphical representation of the percentages of methyl acrylate and plasticizer that give preferred remelt, glass transition and crystallization temperatures.

FIG. 2 illustrates the relationships among amounts of plasticizer and methyl acrylate and performance properties. Given an example of desired target performance of 160 to 175° C. remelt temperature (between solid lines), 40 to 75° C. crystallization temperature (between dashed lines) and −10 to −0° C. glass transition temperature (between dotted lines), the shaded area shows potential compositions that could be used for a vinylidene chloride/methyl acrylate copolymer and a plasticizer composed of 1 percent by weight epoxidized soybean oil and the balance dibutyl sebacate. Variation in the type of plasticizer or plasticizer combination will result in somewhat different placement of the lines. Those skilled in the art are able to determine such lines and composition ranges without undue experimentation given the information herein. Similarly, different target performance properties will also result in different placement of the lines. A higher glass transition temperature is selected for this example of methyl acrylate use because methyl acrylate results in higher glass transition temperatures than are obtained with similar amounts of butyl acrylate.

The composition comprising at least one vinylidene chloride polymer, and at least one plasticizer according to the practice of the invention, is advantageously used for at least one film. Preferably the film is a monolayer film, more preferably a monolayer film used in packaging, most preferably monolayer film used in sausage casing. The film advantageously has a thickness of at least about 1 micron ($1\times10^{-6}$ m), preferably at least about 5 micron ($5\times10^{6}$ m), more preferably at least about 7 micron ($7\times10^{-6}$ m), most preferably at least about 20 micron ($20\times10^{-6}$ m). In most common applications the thickness is advantageously at most about 500 micron ($500\times10^{-6}$ m), preferably at most about 300 micron ($300\times10^{-6}$ m), more preferably at most about 150 micron ($150\times10^{-6}$ m).

The composition is advantageously used for film by at least one film forming method within the skill in the art. Preferably the film forming method is a film blowing method, more preferably a monolayer blown film method, most preferably a monolayer blown film method commonly known to those skilled in the art as the double-bubble method. For instance, processes within the skill in the art for forming film include those disclosed in A. T. Widiger, R. L Butler, in O. J. Sweeting, ed., *The Science and Technology of Polymer Films*, Wiley Interscience, New York, (1971); *Kirk-Othmer: Encyclopedia of Chemical Technoloy*, Fourth Edition, Vol. 24, New York, John Wiley & Sons Inc. 1997, pp. 912-913 and references cited therein. In one embodiment, the film blowing method preferably involves steps of (a) supplying a composition comprising at least one vinylidene chloride polymer, and at least one plasticizer according to the practice of the invention; (b) extruding the composition through an annular die into a tube form; (c) quenching the extruded tube in a cold water bath; and (d) collapsing the tube into a tape form, preferably using a set of nip rolls, preferably at the bottom of the cold tank. In one embodiment, sizing of this tube and the width of the collapsed tape is provided by a volume of fluid (called the sock fluid) that is held inside this extruded tube by the set of nip rolls. The extruded tube with the sock fluid inside it before being collapsed by the cold tank nip rolls is the first bubble of the "double-bubble" process. The cold tank temperature is preferably chosen to optimize the crystallization nucleation of the poly(vinylidene chloride) copolymer. The collapsed tape is reheated as it exits the cold water tank by passing through a warm water tank, to heat it to a temperature that is conducive for crystal nucleus growth during the subsequent bubble blowing step. Then a stable bubble of the composition is formed into a film by entrapping air to push open the collapsed tape exiting the warm tank. This expanded bubble of the final film is the second bubble of the double-bubble process. The film bubble is collapsed and wound onto at least one roll. In a preferred embodiment, the steps include step (a) and at least three of steps (b) through (i) of: (a) supplying a composition comprising at least one vinylidene chloride polymer and at least one plasticizer according to the practice of the invention, and at least one plasticizer according to the practice of the invention, (b) extruding the composition into a tube form, (c) quenching the extruded tube, (d) collapsing the tube into a tape form, (e) reheating the collapsed tape in a warm tank, (f) sizing the tube to attain a desired width of the collapsed tape using a volume of fluid held inside the extruded tube, (g) forming a bubble of the composition, (h) collapsing the film bubble, and (i) winding the resulting film onto at least one roll. The term "stable bubble" means a bubble that does not vary unacceptably in size or shape over time in the second bubble of the process.

Advantageous conditions for a film blowing method include any temperature which is sufficient to allow a sufficient rate of inflation of the collapsed tape to form the bubble but insufficient to cause sticking of the edge of the tape to the nip rolls exiting the warm tank, any pressure which is sufficient to expand the bubble to the desired size but insufficient to cause bubble breaks by excessive expansion. Preferably, the warm tank temperature is at least about 5° C., more preferably at least about 10° C., most preferably at least about 20° C. The warm tank temperature is preferably at most about 80° C., more preferably at most about 60° C., most preferably at most about 40° C. Preferably, the cold tank temperature is at least about 50° C., more preferably at least about 7° C., most preferably at least about 10° C. The cold tank temperature is preferably at most about 50° C., more preferably at most about 35° C., most preferably at most about 20° C. In one preferred embodiment, the film, particularly a monolayer film, is useful to make at least one sausage casing, often referred to as a chub. A sausage casing utilizes such properties of the compositions according to the practice of the invention as film durability, barrier properties, shrink, and adhesiveness to contents of the casing. In one embodiment, the film shrinks when heated to fit tightly about the contents and adheres sufficiently to avoid bubbles that might lead to deterioration of the contents. Sausage casings of compositions different from those according to the practice of the invention often display at least one insufficiency in film durability, barrier properties, shrink, and adhesiveness to contents of the casing. Making sausage casings advantageously comprises (a) folding a strip of film, (b) sealing to form a side seam, (c) filling the resulting tube, and (d) cutting and closing at intervals. The strip is preferably continuous for lengths of at least about 750 m. The intervals are preferably regular. Formation of sausage casings is by any means within the skill in the art, for instance as taught by U.S. Pat. No. 6,713,105 B1 and European Patent 0029316 A1.

More generally, the composition described herein is advantageously a formed into an article such as a film, a package, a foam, a container, a sheet, a laminate or combination thereof; preferably a film, package, sheet, sausage casing or combination thereof; more preferably package including wrap or casing or combination thereof; most preferably food packaging or combination thereof. The compositions are advantageously formed into these articles by such processes as those previously discussed for films or other means within the skill in the art. Preferred processes advantageously include at least the steps of (a) supplying a composition of the invention to a forming apparatus, and (b) blowing the composition preferably into a bubble. Advantageously, the process additionally includes at least one of the steps of (c) admixing the composition with at least one additive as discussed hereinafter, (d) heating the composition sufficiently to facilitate flow through the forming apparatus, or (e) allowing a formed article to cool after forming.

As sausage casings and in other embodiments of the invention, the film is often exposed to heat, for instance, in such uses as packaging, retort packaging, hot fill packaging. Retort packaging is exposed to temperatures sufficient to at least partially cook the package contents at some point in the history of the package. Hot fill packaging is exposed to the heat of recently cooked, prepared or otherwise heated package contents, preferably food, at the time of filling the package. Often the package is in the form of a bag into which hot food is dropped. Then the package is sealed, often using heat, or radio frequency radiation. For such applications, the composition of the invention, especially when in the form of film advantageously withstands heat of at least about 35° C., preferably at least about 75° C., more preferably at least about 85° C., most preferably at least about 93° C. In most applications the highest heat encountered is advantageously at most about 155° C., preferably at most about 145° C., more preferably at most about 135° C., most preferably at most about 125° C. Such heat is advantageously withstood for periods of at least about 1 minute, preferably at least about 20 minutes, more preferably at least about 60 minutes, most preferably at least about 90 minutes. In most applications the heat is encountered for periods of at most about 240, preferably at most about 200, more preferably at most about 150, most preferably at most about 120 minutes. Whether such temperatures are withstood is measured by failure rate of a bag, tube or sausage casing being filled, usually with water, exposed to the temperature for a predetermined time. Failures which are defined as sausage casing breakage during retort as determined visually, unassisted are noted. While complete avoidance of failure is the goal, for purposes of the invention, a structure is considered to survive the stated heat exposure conditions if the structure of the invention exhibits a sausage casing breakage during retort per 10,000 retorted sausages of at most about 500, advantageously at most about 300, more advantageously at most about 200, most advantageously at most about 150, preferably at most about 100, more preferably at most about 50, most preferably at most about 20.

In the practice of the invention radio frequency sealing is advantageously used to prepare articles of the invention, preferably food packaging, more preferably sausage casings. Radio frequency sealing is within the skill in the art, such as disclosed by such references as Steve Myers, *Radio Frequency Sealing for Disposable Medical Products*, Medical Device and Diagnostic Industry Magazine, December, 1999, p. 32.

A variety of additives within the skill in the art are optionally incorporated into the composition. Additive type and amount will depend upon several factors. One such factor is the intended use of the composition. A second factor is tolerance of the composition for the additives. That is, amount of additive that can be added before physical properties of the polymer composition are adversely affected to an unacceptable level. Other factors are apparent to those skilled in the art of composition formulation and compounding.

Exemplary additives include heat and light stabilizers, pigments, processing aids including extrusion aids and lubricants, fillers, antioxidants, process aids such as fluoroelastomers, poly(dimethyl siloxane), alkyl acrylate-alkyl methacrylate copolymers, acid scavengers such as tetrasodium pyrophosphate, dieneophiles, fatty acids, amides or glycerol esters thereof, pigments, dyes, other colorants, optionally with a carrier resin, calcium carbonate, silica or other antiblock agents and combinations thereof. Each of these additives is within the skill in the art and several types of each are commercially available. Preferably, the composition contains only additives commonly used such as the listed types.

Exemplary processing aids and lubricants include fatty acids, such as stearic acid; esters, such as fatty esters, wax esters, glycol esters, and fatty alcohol esters; fatty alcohols, such as n-stearyl alcohol; fatty amides, such as N,N'-ethylene bis stearamide; metallic salt of fatty acids, such as calcium stearate, and magnesium stearate; fluorocarbons, siloxanes, and polyolefin waxes, such as paraffinic waxes, and oxidized polyethylene. Paraffin and polyethylene waxes and their properties and synthesis are described in 24 *Kirk-Othmer Encyclopedia Chem. Tech.* 3rd Ed., Waxes, at 473-77 (J. Wiley & Sons 1980).

Additional additives optionally used in compositions according to the practice of the invention include polymeric film performance additives such as ethylene/vinyl acetate or vinyl chloride/alkyl acrylate copolymers, adhesive such as ethylene/vinyl acetate on the surface of a film of a composition according to the practice of the invention or poly(vinyl chloride) (PVC) on the surface of such a film to improve the physical properties, including the heat sealing and thermoforming performance of the film as compared with that of a film without these features.

Conversely, additives known to have a deleterious effect on similar compositions such as high basicity additives such as those containing amine groups or basic nitrogen atoms in the molecule, or additives containing metal atom that can act as Lewis acid are preferably avoided, at least in amounts causing unacceptable deleterious effects, that is are substantially absent.

Additives are conveniently incorporated into the compositions using any mixing process that does not have substantial adverse effects on the polymer or additives, preferably dry blending techniques, alternatively melt blending or other means within the skill in the art. Other incorporation methods within the state of the art include addition to polymer slurry or spray addition. In the practice of the invention it is advantageous that the additive incorporation be uniform. While the amount of additives varies with the purpose and the effect of each additive, amounts of additives (excluding plasticizers) and in terms of weight percent based on total composition including polymers, plasticizers, and other additives advantageously are none or preferably at least about 0.1, more preferably at least about 0.3, most preferably at least about 0.5 and advantageously at most about 50, preferably at most about 10, more preferably at most 5, most preferably at most about 3 weight percent.

Similarly, compositions according to the practice of the present invention optionally contain other polymers within the skill in the art. Polymer type and amount will depend upon several factors. One such factor is the intended use of the composition. A second factor is compatibility of the polymers, that is, whether the polymers can form a sufficiently homogeneous mixture that does not separate undesirably for the intended purpose. Other factors are apparent to those skilled in the art. In one embodiment, the compositions contain at least two vinylidene chloride polymers according to the practice of the invention. In another embodiment, the compositions contain at least one vinylidene chloride polymer according to the practice of the invention and at least one vinylidene chloride polymer different from those taught herein such as at least one vinylidene chloride polymers having more alkyl acrylate or vinyl chloride than the vinylidene chloride polymers according to the practice of the invention. In yet another embodiment, the compositions contain at least one vinylidene chloride polymer according to the practice of the invention and at least one thermoplastic polyurethane or copolymer of an alpha olefin and an alkyl ester of an unsaturated carboxylic acid, preferably a thermoplastic polyurethane or ethylene/methyl acrylate copolymer or ethylene/butyl acrylate copolymers, more preferably in one embodiment a thermoplastic polyurethane, or more preferably in another embodiment a copolymer of an alpha olefin and an alkyl ester of an unsaturated carboxylic acid; or combination thereof. When used in combination with other polymers, one or more vinylidene chloride polymers according to the practice of the invention are advantageously more than about 50 weight percent of the composition, more advantageously at least about 80, most advantageously at least about 90, preferably at least about 95, more preferably at least about 97, most preferably at least about 98 weight percent of the polymer composition up to about 100 weight percent of the composition. Other polymers are conveniently incorporated into the composition using any mixing process that does not have substantial adverse effects on the polymers, other components or additives, preferably physical or melt blending, combinations therefor other means within the skill in the art.

Thermoplastic polyurethanes (TPU) are known and are described, for example in U.S. Pat. Nos. 6,291,587; 6,294,638; 6,319,985 and 6,323,299. Copolymers of olefins and alkyl esters of unsaturated carboxylic acids are known in the art and commercially available such as the ethylene/methyl acrylate copolymers and ethylene/butyl acrylate copolymers commercially available from Eastman Chemical Company under the trade designations EMAC, EMAC+, EBAC and EBAC+ with numeric designations beginning with the letters SP, such as SP 2255, SP2258, SP2205, SP1400, SP 1307, and SP 1903. Preferred olefins are alpha olefins, that is, ethylenically unsaturated compounds having a single double bond in the alpha or first position. Of the alpha olefins, preferably $C_2$-$C_{20}$, more preferably $C_2$-$C_{10}$ alpha olefins; ethylene is most preferred; other alpha olefins include propylene, 1-butene, 1-pentene, 1-hexene, 1-heptene, and 1-octene. Among effective alkyl esters of unsaturated carboxylic acids, the alkyl esters of acrylic and methacrylic acid are preferred, with acrylates more preferred. Of the alkyl esters, straight chain alkyl groups are preferred, with sizes of $C_1$ to $C_{20}$ preferred, $C_1$ to $C_4$ alkyl groups more preferred and methyl groups most preferred. The copolymers are optionally, but not preferably, terpolymers or higher polymers, having up to about 30, advantageously less than about 20, preferably less than about 10, more preferably less than about 5, most preferably less than about 3 weight percent of at least one other ethylenically unsaturated monomer interpolymerized therewith. These optional monomers include styrene, acrylonitrile, methyl methacrylate, acrylic acid, methacrylic acid, vinyl acetate and combinations thereof. Methyl acrylate is the most preferred alkyl ester. The copolymer advantageously has at least about 1, more preferably at least about 20 weight percent alkyl ester based on total weight of the copolymer of olefin and alkyl ester of unsaturated carboxylic acid. While up to about 50 weight percent or more alkyl ester is useful, more preferably less than or equal to 40, most preferably less than about 30 weight percent alkyl ester is present in the copolymer to achieve a good balance of high meat adhesion enhancement and low extractability of the copolymer of olefin and ester into the fat of a packaged meat or similar product. For use in compositions from which films for food contact are to be made, it is advantageous that levels of materials extractable into food, for instance fat, be low.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

Example 1

Vinylidene chloride-butyl acrylate copolymer is produced in a suspension process. A 500-gallon, glass lined reactor is loaded with 42.1 Kg butyl acrylate, 724 Kg vinylidene chloride, 954 Kg water, 7.66 Kg epoxidized soybean oil, 12.8 Kg of a 3 weight percent aqueous solution of tetrasodium pyrophosphate, 38.3 gm 2,6 di-t-butyl-4-methyl phenol, 1.90 Kg t-butyl per-2-ethylhexanoate and 77.4 Kg of a 1 weight percent aqueous solution of hydroxypropyl methyl cellulose as suspending agent. The mixture is agitated using a twin pitched blade turbine agitator at 52 rpm (revolutions per minute) to form a suspension. The temperature is increased from 20 to 70° C. Polymerization is allowed to proceed for 8.4 hours during which time the temperature is increased to 80° C. and the agitation to 100 rpm. Conversion of monomer to polymer is approximately 93 weight percent. Unreacted monomer is then vented from the reactor. The resulting product polymer in suspension is heated to 90° C. under vacuum to remove the remaining unreacted monomer. The polymer product is separated from the water and air dried at 75° C. to 90° C. The resultant product is 122,000 in molecular weight, has a particle size of 266 microns ($266 \times 10^{-6}$ m) (volume average), has 0.3 ppm (part per million, or 0.00003 weight percent) residual vinylidene chloride and 5.1 ppm butyl acrylate monomers, 0.87 weight percent epoxidized soybean oil and has a remelt temperature of 173.3° C.

The vinylidene chloride-butyl acrylate copolymer base resin is further formulated to give a blended resin suitable for monolayer film extrusion. This final formulated blend contains 2.5 weight percent of dibutyl sebacate, 2.5 weight percent epoxidized soybean oil, 0.1% paraffin wax, 0.1 percent oxidized polyethylene wax, 0.11 percent calcium carbonate, 0.11 percent stearamide and 0.15 percent of a 50/50 compounded blend of high density polyethylene and poly(dimethyl siloxane). These ingredients are blended in a high intensity mixer, where the solid additives are first added and allowed for thorough dispersion, followed by the addition of liquid plasticizers with thorough mixing. The blended resin is allowed to rest for a minimum of one day to allow the absorption of the liquid plasticizers into the resin, before extrusion of the blended resin.

Film extrusion is performed on a blown film extrusion line consisting of a 3.5 inch (90 mm, 0.09 m) extruder, Model J007790, made by Egan Machinery and film blowing equipment, Model ME-SNIP-64-3HP-250, manufactured by Macro Engineering, Canada. The screw used is single flighted, with a 24 to 1 L/D (length to diameter) ratio and a 3:1 compression ratio. The extrusion line is equipped with a cold water quench tank, where the annular extrudate is quenched before being blown, followed by a warm water tank where the collapsed tape (flattened tube) is warmed. The warmed tube is then blown biaxially. The detailed film extrusion conditions are as follows:

Extruder temperature and pressure profile:
Feed Zone: 40° C.

| Zone 1: 168° C. | 1100 psi (7585 kPa) |
| Zone 2: 165° C. | 3345 psi (23064 kPa) |
| Zone 3: 162° C. | 321 psi (2213 kPa) |
| Zone 4: 159° C. | 2117 psi (14597 kPa) |
| Zone 5: 156° C. | 2065 psi (14238 kPa) |

Adaptor: 165° C.
Die: 165° C.
Extruder rpm: 38 (0.63 r/s)
Extrusion rate: 235 lb/hr (1.78 kg/s), starve fed (that is the rate of feed is controlled by a feeder metering the solid feed into the hopper instead of by the rate of rotation of the extrusion screw)
Head Pressure: 2134 psi (14714 kPa)
Cold tank temperature: 53° F. (11.7° C.)
Warm tank temperature: 95° F. (35° C.)
Blow Up Ratio: 4.04 (measured by the ratio of lay flat width of the blown film to the lay flat width of the collapsed tape from which the film is blown).
Machine Direction Stretch Ratio: 3.46
Film Gauge=160 gauge (40.6 micron or $40.6 \times 10^{-6}$ m) double wound (Each layer is 80 gauge (20.3 micron or $20.3 \times 10^{-6}$ m).)

The physical properties of the film are as follows:
Elmendorf Tear Strength, as determined by the procedures of ASTM DI 922, machine direction (MD)=18 g/mil (708660 g/m), cross direction (CD)=20 g/mil (787400 g/m).
Dart Drop Impact Strength, as determined by the procedures of ASTM D1709=119 g
Shrinkage, as determined by the procedures of ASTM D1204, MD=22 percent length, CD=17 percent length
Blocking Strength, as determined by the procedures of ASTM D3354=25 g
Oxygen Permeability, as determined by the procedures of ASTM D3985=1.79 cc-mil/100 sq.in-day-atm ($8.157 \times 10E-15$ $m^3 \cdot m/m^2 \cdot sec-atm$).

Example 2

A glass citrate bottle is loaded with 6.22 gram butyl acrylate, 88.58 gram vinylidene chloride, 0.96 gram epoxidized soybean oil, 4.00 grams dibutyl sebacate, 0.0048 gram 2,6 di-t-butyl-4-methyl phenol, 0.235 gram t-butyl per-2-ethylhexanoate, 0.10 gram hydroxypropyl methyl cellulose, 0.034 gram tetrasodium pyrophosphate and 149.87 gram water. The citrate bottle is capped and placed in a water bath. The bottle is tumbled in the bath to provide mixing. The temperature is increased from ambient to 70° C. Polymerization is allowed to proceed for 10 hours increasing the temperature to 80° C. Polymer is separated from water and dried at 70° C. for 15 hours. The recovered yield is approximately 93 weight percent. The molecular weight is 102,400 Mw (weight average molecular weight).

Example 3

A glass citrate bottle is loaded with 4.27 gram methyl acrylate, 90.54 gram vinylidene chloride, 0.96 gram epoxidized soybean oil, 4.00 grams dibutyl sebacate, 0.0048 gram 2,6 di-t-butyl-4-methyl phenol, 0.235 gram t-butyl per-2-ethylhexanoate, 0.10 gram hydroxypropyl methyl cellulose, 0.034 gram tetrasodium pyrophosphate and 149.87 gram water. The citrate bottle is capped and placed in a water bath. The bottle is tumbled in the bath to provide mixing. The temperature is increased from ambient to 70° C. Polymerization is allowed to proceed for 10 hours increasing the temperature to 80° C. Polymer is separated from water and dried at 70° C. for 15 hours. The recovered yield is approximately 91 weight percent. The molecular weight is 98,600 Mw.

Example 4

A glass citrate bottle is loaded with 4.93 gram ethyl acrylate, 89.87 gram vinylidene chloride, 0.96 gram epoxidized soybean oil, 4.00 grams dibutyl sebacate, 0.0048 gram 2,6 di-t-butyl-4-methyl phenol, 0.235 gram t-butyl per-2-ethylhexanoate, 0.10 gram hydroxypropyl methyl cellulose, 0.034 gram tetrasodium pyrophosphate and 149.87 gram water. The citrate bottle is capped and placed in a water bath. The bottle is tumbled in the bath to provide mixing. The temperature is increased from ambient to 70° C. Polymerization is allowed to proceed for 10 hours increasing the temperature to 80° C. Polymer is separated from water and dried at 70° C. for 15 hours. The recovered yield is approximately 92 weight percent. The molecular weight is 99,900 Mw.

Example 5

A glass citrate bottle is loaded with 3.16 gram methyl acrylate, 2.26 gram 2-ethylhexyl acrylate, 89.39 gram vinylidene chloride, 0.96 gram epoxidized soybean oil, 4.00 grams dibutyl sebacate, 0.0048 gram 2,6 di-t-butyl-4-methyl phenol, 0.235 gram t-butyl per-2-ethylhexanoate, 0.10 gram hydroxypropyl methyl cellulose, 0.034 gram tetrasodium pyrophosphate and 149.87 gram water. The citrate bottle is capped and placed in a water bath. The bottle is tumbled in the bath to provide mixing. The temperature is increased from ambient to 70° C. Polymerization is allowed to proceed for 10 hours increasing the temperature to 80° C. Polymer is separated from water and dried at 70° C. for 15 hours. The recovered yield is approximately 94 weight percent. The molecular weight is 106,000 Mw.

Comparative Example A

A glass citrate bottle is loaded with 7.11 gram methyl acrylate, 87.69 gram vinylidene chloride, 0.96 gram epoxidized soybean oil, 4.00 grams dibutyl sebacate, 0.0048 gram 2,6 di-t-butyl-4-methyl phenol, 0.235 gram t-butyl per-2-ethylhexanoate, 0.10 gram hydroxypropyl methyl cellulose, 0.034 gram tetrasodium pyrophosphate and 149.87 gram water. The citrate bottle is capped and placed in a water bath. The bottle is tumbled in the bath to provide mixing. The temperature is increased from ambient to 70° C. Polymerization is allowed to proceed for 10 hours increasing the temperature to 80° C. Polymer is separated from water and dried at 70° C. for 15 hours. The recovered yield is approximately 92 weight percent. The molecular weight is 98,000 Mw.

Comparative Example B

Comparative Example B is a vinylidene chloride/vinyl chloride copolymer commercially available from The Dow Chemical Company under the trade designation Saran 168 for use in film and chub applications. As such, its properties are used as a performance standard. Amounts of comonomer and plasticizer useful to achieve desired performance characteristics differ between vinylidene chloride/vinyl chloride resins and vinylidene chloride/alkyl acrylate resins because of the fundamental differences in the resins.

TABLE 1

| Example (Ex)/ comparative sample (CS)* | Comonomer type | Comonomer mole % | Plasticizer weight % | Extrusion stability (Remelt ° C.) | Bubble stability (Crystallization ° C.) |
|---|---|---|---|---|---|
| Ex 2 | Butyl acrylate | 5.0 | 5 | 166 | 52 |
| Ex 3 | Methyl acrylate | 5.0 | 5 | 171 | 51 |
| Ex 4 | Ethyl acrylate | 5.0 | 5 | 167 | 51 |

TABLE 1-continued

| Example (Ex)/ comparative sample (CS)* | Comonomer type | Comonomer mole % | Plasticizer weight % | Extrusion stability (Remelt ° C.) | Bubble stability (Crystallization ° C.) |
|---|---|---|---|---|---|
| Ex 5 | Methyl acrylate, 2-ethylhexyl acrylate | 5.0 | 5 | 169 | 49 |
| CS A* | Methyl acrylate | 8.4 | 5 | 151 | 86 |
| CS B* | Vinyl chloride | | | 165 | 63 |

*Note that comparative samples are not examples of the invention.

Table 1 shows the effect of comonomer selection on extrusion and bubble stability. In this case lower remelt or crystallization temperature is better. The performance standard is set by the vinyl chloride resin, which performs well in extrusion processing. This example shows how a butyl acrylate resin composition can give similar performance to the less productive vinyl chloride resin. The equally productive methyl acrylate resin with high acrylate content gives an unacceptably high crystallization temperature. At low methyl acrylate content these resins give acceptable crystallization rate.

Example 6

Vinylidene chloride-methyl acrylate copolymer is produced in a suspension process. A 500-gallon, glass lined reactor is loaded with 36.8 Kg methyl acrylate, 731 Kg vinylidene chloride, 956 Kg water, 7.67 Kg epoxidized soybean oil, 13.0 Kg of a 3 weight percent aqueous solution of tetrasodium pyrophosphate, 38.4 gm 2,6 di-t-butyl-4-methyl phenol, 1.92 Kg t-butyl per-2-ethylhexanoate and 77.6 Kg of a 1 weight percent aqueous solution of hydroxypropyl methyl cellulose as suspending agent. The mixture is agitated with a twin pitched blade turbine agitator at 52 rpm to form a suspension. The temperature is increased from 20 to 68.5° C. Polymerization is allowed to proceed for 8.8 hours increasing the temperature to 80° C. and the agitation to 100 rpm. Conversion of monomer to polymer is approximately 93 weight percent. Unreacted monomer is then vented from the reactor. The resulting product polymer in suspension is heated to 90° C. under vacuum to remove the remaining unreacted monomer. The polymer product is separated from the water and air dried at 75° C. to 90° C. The resultant product is 118,900 Mw, has a particle size of 266 microns ($266 \times 10^{-6}$ m) (volume average), has 2.8 ppm (part per million, or 0.00028 weight percent) residual vinylidene chloride and less than 1 ppm methyl acrylate monomers, 0.85 weight percent epoxidized soybean oil and has a remelt temperature of 170.7° C.

The vinylidene chloride-methyl acrylate copolymer base resin is further formulated to give a blended resin suitable for monolayer film extrusion. This final formulated blend contains 2.5 weight percent of dibutyl sebacate, 2.5 weight percent epoxidized soybean oil, 0.1 percent paraffin wax, 0.1 percent oxidized polyethylene wax, 0.11 percent calcium carbonate, 0.11 percent stearamide and 0.15 percent of a 50/50 compounded blend of high density polyethylene and poly(dimethyl siloxane). These ingredients are blended in a high intensity mixer, where the solid additives are first added and allowed for thorough dispersion, followed by the addition of liquid plasticizers with thorough mixing. The blended resin is allowed to rest for a minimum of one day to allow the absorption of the liquid plasticizers into the resin, before extrusion of the blended resin.

The film extrusion is performed on the equipment described in Example 1. The screw used is single flighted, with a 24 to 1 L/D (length to diameter) ratio and a 3:1 compression ratio. The extrusion line is equipped with a cold water quench tank, where the annular extrudate is quenched before being blown, followed by a warm water tank where the collapsed tape (flattened tube) is warmed. The warmed tube is then blown biaxially. The detailed film extrusion conditions are as follows:

Extruder temperature and pressure profile:

Feed Zone: 40° C.

| Zone 1: 169° C. | 1093 psi (7537 kPa) |
| Zone 2: 166° C. | 3293 psi (22705 kPa) |
| Zone 3: 162° C. | 694 psi (4784 kPa) |
| Zone 4: 158° C. | 2337 psi (16114 kPa) |
| Zone 5: 156° C. | 2065 psi (13049 kPa) |

Adaptor: 165° C.

Die: 165° C.

Extruder rpm: 35 (0.583 r/s)

Extrusion rate: 235 lb/hr (1.78 kg/s), starve fed (that is the rate of feed is controlled by a feeder metering the solid feed into the hopper instead of by the rate of rotation of the extrusion screw)

Head Pressure: 2083 psi (14302 kPa)

Cold tank temperature: 68° F. (20° C.)

Warm tank temperature: 100° F. (37.8° C.)

Blow Up Ratio: 3.91 (measured by the ratio of lay flat width of the blown film to the lay flat width of the collapsed tape from which the film is blown).

Machine Direction Stretch Ratio: 4.16

Film Gauge=160 gauge (40.6 micron or $40.6 \times 10^{-6}$ m) double wound (Each layer is 80 gauge (20.3 micron or $20.3 \times 10^{-6}$ m).)

The physical properties of the film are as follows:

Elmendorf Tear Strength, as determined by the procedures of ASTM DI 922, machine direction (MD)=20 g/mil (787400 g/m), cross direction (CD)=18 g/mil (708660 g/m)

Dart Drop Impact Strength, as determined by the procedures of ASTM DI 709=119 g

Shrinkage, as determined by the procedures of ASTM D1204, MD=29 percent length, CD=23 percent length Blocking Strength, as determined by the procedures of ASTM D3354=69 g Oxygen Permeability, as determined by the procedures of ASTM D3985=1.41 cc-mil/100 sq.in-day-atm (6.425×10E-15 m$^3$·m/m$^2$·sec-atm).

Example 7

A vinylidene chloride-methyl acrylate copolymer base resin, prepared using the procedure of Example 6, of 95.2 percent vinylidene chloride and 4.8 percent methyl acrylate and containing 0.76 percent epoxidized soybean oil is further formulated to give a blended resin suitable for monolayer film extrusion. This final formulated blend contains 2.5 weight percent of dibutyl sebacate, 2.5 weight percent epoxidized soybean oil, 0.1 percent paraffin wax, 0.1 percent oxidized polyethylene wax, 0.11 percent calcium carbonate, 0.11 percent stearamide and 0.15 percent of a 50/50 compounded blend of high density polyethylene and poly(dimethyl siloxane). These ingredients are blended in a high intensity mixer, where the solid additives are first added and allowed for thorough dispersion, followed by the addition of liquid plasticizers with thorough mixing. The blended resin is allowed to rest for a minimum of one day to allow the absorption of the liquid plasticizers into the resin, before extrusion of the blended resin.

The film extrusion is performed on the equipment described in Example 1. The screw used is single flighted, with a 24 to 1 L/D (length to diameter) ratio and a 3:1 compression ratio. The extrusion line is equipped with a cold water quench tank, where the annular extrudate is quenched before being blown, followed by a warm water tank where the collapsed tape (flattened tube) is warmed. The warmed tube is then blown biaxially. The detailed film extrusion conditions are as follows:

Extruder temperature and pressure profile:
Feed Zone: 40° C.

| | |
|---|---|
| Zone 1: 170° C. | 1116 psi (7696 kPa) |
| Zone 2: 162° C. | 3544 psi (24436 kPa) |
| Zone 3: 162° C. | 2240 psi (15441 kPa) |
| Zone 4: 157° C. | 2217 psi (15287 kPa) |
| Zone 5: 163° C. | 2371 psi (14983 kPa) |

Adaptor: 165° C.
Die: 165° C.
Extruder rpm: 37 (0.583 r/s)
Extrusion rate: 246 lb/hr (1.86 kg/s), starve fed (that is the rate of feed is controlled by a feeder metering the solid feed into the hopper instead of by the rate of rotation of the extrusion screw)
Head Pressure: 2121 psi (14563 kPa)
Cold tank temperature: 60° F. (15.6° C.)
Warm tank temperature: 87° F. (30.6° C.)
Blow Up Ratio: 4.26 (measured by the ratio of lay flat width of the blown film to the lay flat width of the collapsed tape from which the film is blown).
Machine Direction Stretch Ratio: 4.25
Film Gauge=160 gauge (40.6 micron or 40.6×10$^{-6}$ m) double wound (Each layer is 80 gauge (20.3 micron or 20.3×10$^{-6}$ m).)

TABLE 2

| Example (Ex)/ comparative sample (CS)* | Comonomer type | Comonomer mole % | Plasticizer % | Oxygen Permeability (cc-mil/100 sq.in-atm-day) | Oxygen Permeability (m$^3$·m/m$^2$·sec·atm) | Retort breakage % |
|---|---|---|---|---|---|---|
| Ex 1 | Butyl acrylate | 5.5 | 5 | 1.79 | 8.16 × 10E−15 | 2 |
| Ex 7 | Methyl acrylate | 4.8 | 6.5 | 1.41 (Note 1) | 6.43 × 10E−15 | 0 |
| CS B* | Vinyl chloride | | | 1.48 | 6.74 × 10E−15 | 1 |

*Note that comparative samples are not examples of the invention.
Note 1: This is estimated value, based on a measured oxygen permeability of 1.41 cc-mil/100 sq.in-atm-day (6.43 × 10E−15 m$^3$·m/m$^2$·sec·atm) for a similar methyl acrylate copolymer where the level of methyl acrylate is 5.8 percent and the level of plasticizer is identical.

Table 2 shows the effect of comonomer selection on durability at constant barrier. In this illustration lower barrier and lower breakage is better. The performance standard is set by the vinyl chloride resin, which performs well from a film performance standpoint. All resins gave acceptable barrier; however, the methyl acrylate resin had higher retort breakage.

Example 8

A series of monomer mixtures of vinylidene chloride and acrylate monomer as shown in Table 3 is prepared. Each contains 0.2 percent epoxidized soybean oil, 3400 ppm t-butyl per-2-ethylhexanoate and 50 ppm di-t-butyl-4-methyl phenol. A water solution containing 1500 ppm hydroxypropyl methyl cellulose and 508 ppm tetrasodium pyrophosphate is also prepared. To a Mettler RC1 calorimetric reactor with 1-liter glass vessel are added 296.5±0.5 grams of the monomer mixture and 369.5±0.5 grams of the water solution. The mixture is agitated at 600 rpm. The reactor temperature is increased from 20° C. to 71° C. over 120 minutes. The reactor temperature is then held constant at 71° C. for 120 minutes. The heat release rate is measured by the calorimetric reactor. From this, the polymerization rate at 6 percent conversion of monomer to polymer and 71° C., in terms of percent of conversion of monomer to polymer per hour, is calculated. Polymerization rates are calculated assuming heats of polymerization of 334, 394 and 262 BTU/pound (776350, 915814 and 608993 J/kg, respectively) for vinylidene chloride, methyl acrylate and butyl acrylate respectively. The results are shown in Table 3. The relative rates of polymerization of copolymer compared to vinylidene chloride homopolymer are calculated and also shown in Table 3. These are compared to the relative rates of comparative vinyl chloride copolymers from W. I. Begnough and R. G. W. Norrish, *Proc. R. Soc. A*218, 155 (1953). It should be noted that the mole percent vinyl chloride is higher. This is however, consistent with the range of vinyl chloride copolymers available commercially for monolayer films applications. This data shows the higher relative polymerization rate of vinylidene chloride-acrylate polymers compared to alternative vinylidene chloride-vinyl chloride copolymers suitable for similar applications.

TABLE 3

| Comonomer | Mole % Comonomer | Polymerization Rate, %/hour | Relative Rate |
| --- | --- | --- | --- |
| None | 0 | 12.3 | — |
| Methyl acrylate | 5.4 | 8.4 | 0.68 |
| Methyl acrylate | 6.2 | 8.1 | 0.66 |
| Butyl acrylate | 4.2 | 9.7 | 0.79 |
| Butyl acrylate | 5.4 | 9.3 | 0.76 |
| Vinyl chloride | 22 | | 0.45 |
| Vinyl chloride | 25 | | 0.41 |
| Vinyl chloride | 28 | | 0.35 |

The invention claimed is:

1. An article selected from a package, a container, a laminate, a sausage casing or a combination thereof comprising a monolayer blown film prepared from a composition including at least one vinylidene chloride polymer and at least one plasticizer present in an amount of from 3 to 9 parts by weight per hundred parts of polymer, and selected from ester plasticizers and combinations of ester plasticizer and epoxy plasticizer wherein at least one vinylidene chloride polymer comprises vinylidene chloride and at least one alkyl acrylate selected from methyl acrylate, ethyl acrylate, or butyl acrylate or a combination thereof in an amount of from 3.8 to 7.5 mole percent of the monomer content of the vinylidene chloride polymer from wherein the alkyl acrylate is present in an amount that results in at least 4 of the following characteristics:
  (a) the crystallization temperature as determined by differential scanning calorimetry (DSC) is at most about 75° C.;
  (b) the remelt temperature as determined by DSC is from 100° C. to 175° C.;
  (c) the failure rate is at most about 150 per 10000 after having been heated to a temperature of from 75° C. to 145° C. for a period of from 20 minutes to 200 minutes:
  (d) the oxygen permeability as determined by the procedures of ASTM D3985 is from $4.6 \times 10E-17$ m$^3$.m/m$^2$.sec.atm to $4.6 \times 10E-13$ m$^3$.m/m$^2$.sec.atm; and
  (e) the glass transition temperature as determined by DSC of at most about 0° C.

2. The article of claim 1 wherein the alkyl acrylate is methyl acrylate or butyl acrylate and the alkyl acrylate is present in an amount from 4.2 to 6.5 mole percent of the vinylidene chloride polymer, and which results in all 5 of the following characteristics:
  (a) the crystallization temperature is at most about 60° C.;
  (b) the remelt temperature is from 100° C. to 175° C.;
  (c) the failure rate is at most about 20 per 10000 after having been heated to a temperature of from 75° C. to 145° C. for a period of from 20 minutes to 200 minutes:
  (d) the oxygen permeability is from $4.6 \times 10E-17$ m$^3$.m/m$^2$.sec.atm $2.3 \times 10E-14$ m$^3$.m/m$^2$.sec.atm; and
  (e) the glass transition temperature of at most about −4° C.

3. The article of claim 1 wherein the film is blown using a double bubble process.

4. The article of claim 1 which is a sausage casing.

5. The article of any of claims 1, 2, 3 or 4 containing in addition to the vinylidene chloride polymer, less than 50 weight percent of total polymer of at least one thermoplastic polyurethane or copolymer of an alpha olefin and an alkyl ester of an unsaturated carboxylic acid, or a combination thereof.

6. The article of claim 5 containing in addition to the vinylidene chloride polymer, at least one copolymer of an alpha olefin and an alkyl ester of an unsaturated carboxylic acid selected from ethylene/methyl acrylate copolymer, ethylene/butyl acrylate copolymers and combinations thereof.

7. A process of forming the film in claim 1 by blowing a monolayer film using a double-bubble method comprising steps of (a) supplying a composition comprising at least one vinylidene chloride polymer, and at least one plasticizer wherein at least one vinylidene chloride polymer comprises vinylidene chloride and at least one alkyl acrylate selected from methyl acrylate, ethyl acrylate, or butyl acrylate or a combination thereof in an amount of from 3.8 to 7.5 mole percent of the monomer content of the vinylidene chloride polymer and wherein the plasticizer is present in an amount of from 3 to 9 parts by weight per hundred parts of polymer; (b) extruding the composition through an annular die into a tube form; (a) quenching the extruded tube in a cold water bath; and (d) collapsing the tube into a tape form.

8. The process of claim 7 wherein the process additionally comprises (e) reheating the collapsed tape in a warm tank, (f) sizing the tube to attain a desired width of the collapsed tape using a volume of fluid held inside the extruded tube, (g) forming a bubble of the composition, (h) collapsing the film bubble, and (i) winding the resulting film onto at least one roll.

9. The process of claim 8 additionally comprising a step preceding step (a) of polymerizing the vinylidene chloride and alkyl acrylate monomer together at a rate that exceeds the rate of polymerization of the vinylidene chloride and vinyl chloride under the same conditions.

* * * * *